US008688952B2

(12) United States Patent
Kimura

(10) Patent No.: US 8,688,952 B2
(45) Date of Patent: Apr. 1, 2014

(54) ARITHMETIC PROCESSING UNIT AND CONTROL METHOD FOR EVICTING AN ENTRY FROM A TLB TO ANOTHER TLB

(75) Inventor: Hiroaki Kimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 220 days.

(21) Appl. No.: 12/654,309

(22) Filed: Dec. 16, 2009

(65) Prior Publication Data

US 2010/0106938 A1    Apr. 29, 2010

Related U.S. Application Data

(63) Continuation of application No. PCT/JP2007/062465, filed on Jun. 20, 2007.

(51) Int. Cl.
*G06F 12/00* (2006.01)

(52) U.S. Cl.
USPC ........... 711/207; 711/202; 711/205; 711/206; 711/208; 711/209

(58) Field of Classification Search
USPC .......................................... 711/202, 205–209
See application file for complete search history.

(56) References Cited

U.S. PATENT DOCUMENTS

| 5,717,885 A * | 2/1998 | Kumar et al. ................ 711/207 |
| 5,752,274 A * | 5/1998 | Garibay et al. ............... 711/206 |
| 5,928,352 A | 7/1999 | Gochman et al. |
| 6,397,296 B1 | 5/2002 | Werner |
| 6,418,521 B1 | 7/2002 | Mathews et al. |
| 6,931,504 B2 * | 8/2005 | Wolczko et al. .............. 711/165 |
| 7,490,214 B2 * | 2/2009 | Cholleti et al. ............... 711/202 |
| 2004/0024986 A1 | 2/2004 | Devereux |
| 2004/0221090 A1 | 11/2004 | Ike |
| 2005/0273572 A1 | 12/2005 | Takahashi et al. |
| 2006/0179235 A1 * | 8/2006 | Bell et al. ..................... 711/136 |
| 2006/0224857 A1 | 10/2006 | O'Connor et al. |

FOREIGN PATENT DOCUMENTS

| JP | 51-140521 | 12/1976 |
| JP | 59-098367 | 6/1984 |
| JP | 1-226056 | 9/1989 |
| JP | 3-164845 | 7/1991 |
| JP | 5-324477 | 12/1993 |
| JP | 6-187244 | 7/1994 |
| JP | 11-501745 | 2/1999 |

(Continued)

OTHER PUBLICATIONS

European Search Report dated Oct. 21, 2010 in corresponding European Patent Application 07767303.6.

(Continued)

*Primary Examiner* — Arpan P. Savla
(74) *Attorney, Agent, or Firm* — Staas & Halsey LLP

(57) ABSTRACT

An arithmetic processing apparatus includes: a plurality of TLBs holding as entries a portion of a conversion table for conversion of virtual addresses into physical addresses that has been placed in a main memory unit; an entry registration determining unit that, while registering an entry output from the main memory unit in any one of a plurality of TLBs, determines whether an entry has already been registered in an area of a TLB as registration destination; and a relocation control unit that, when the entry registration determining unit determines that an entry has already been registered in the area of the TLB as registration destination, evicts the entry that has already been registered and registers evicted entry in other TLB.

10 Claims, 10 Drawing Sheets

(56) References Cited

FOREIGN PATENT DOCUMENTS

| JP | 2000-242558 | 9/2000 |
|----|-------------|--------|
| JP | 2005-346358 | 12/2005 |
| JP | 2006-39968 | 2/2006 |
| WO | 96/27834 | 9/1996 |

OTHER PUBLICATIONS

Japanese Office Action for corresponding application JP 2009-520205, mailed on Jun. 29, 2010.
International Search Report for PCT/JP2007/062465, mailed Feb. 12, 2008.

* cited by examiner

LOCK RELOCATION
BIT    BIT
VALID  USED
BIT    BIT fTLB
| ENTRY 0 | 1 | 1 | 0 | 0 |
| ENTRY 1 | 0 | 0 | 0 | 0 |
| ENTRY 2 | 1 | 1 | 1 | 0 |
| ENTRY 3 | 1 | 0 | 1 | 0 |
| ENTRY 4 | 1 | 1 | 0 | 0 |
| ENTRY 5 | 0 | 0 | 0 | 0 |
| ENTRY 6 | 1 | 1 | 1 | 0 |
| ENTRY 7 | 1 | 0 | 0 | 0 |

(2)

fTLB
| ENTRY 0 | 1 | 1 | 0 | 0 |
| ENTRY 1 | 0 | 0 | 0 | 0 |
| ENTRY 2 | 1 | 1 | 1 | 0 |
| ENTRY 3 | 1 | 0 | 1 | 0 |
| ENTRY 4 | 1 | 1 | 0 | 0 |
| ENTRY 8 | 1 | 0 | 1 | 1 |
| ENTRY 6 | 1 | 1 | 1 | 0 |
| ENTRY 7 | 1 | 0 | 0 | 0 |

(3)

fTLB
| ENTRY 0 | 1 | 1 | 0 | 0 |
| ENTRY 1 | 0 | 0 | 0 | 0 |
| ENTRY 2 | 1 | 1 | 1 | 0 |
| ENTRY 3 | 1 | 0 | 1 | 0 |
| ENTRY 4 | 1 | 1 | 0 | 0 |
| ENTRY 8 | 1 | 0 | 1 | 1 |
| ENTRY 6 | 1 | 1 | 1 | 0 |
| ENTRY 9 | 1 | 0 | 1 | 1 |

(4)

fTLB
| ENTRY 0 | 1 | 1 | 0 | 0 |
| ENTRY 1 | 0 | 0 | 0 | 0 |
| ENTRY 2 | 1 | 1 | 1 | 0 |
| ENTRY 3 | 1 | 0 | 1 | 0 |
| ENTRY 4 | 1 | 1 | 0 | 0 |
| ENTRY 8 | 1 | 0 | 0 | 1 |
| ENTRY 6 | 1 | 1 | 0 | 0 |
| ENTRY 9 | 1 | 0 | 0 | 1 |

(5)

fTLB
| ENTRY 0 | 1 | 1 | 0 | 0 |
| ENTRY 1 | 0 | 0 | 0 | 0 |
| ENTRY 2 | 1 | 1 | 1 | 0 |
| ENTRY 3 | 1 | 0 | 1 | 0 |
| ENTRY 4 | 1 | 1 | 0 | 0 |
| ENTRY 10 | 1 | 0 | 1 | 1 |
| ENTRY 6 | 1 | 1 | 0 | 0 |
| ENTRY 9 | 1 | 0 | 0 | 1 |

ARITHMETIC PROCESSING UNIT AND CONTROL METHOD FOR EVICTING AN ENTRY FROM A TLB TO ANOTHER TLB

CROSS-REFERENCE TO RELATED APPLICATION(S)

This application is a continuation of International Application No. PCT/JP2007/062465, filed on Jun. 20, 2007, the entire contents of which are incorporated herein by reference.

FIELD

The embodiments discussed herein are directed to an arithmetic processing unit that includes a plurality of TLBs holding as entries a portion of a conversion table for conversion of virtual addresses into physical addresses that has been placed in a main memory unit, and to an entry control method.

BACKGROUND

Typically, in an information processing apparatus employing a virtual storage system, a conversion table (page table) for conversion of virtual addresses into physical addresses is placed in a main memory unit. Then, while executing a program that has been loaded in the main memory unit, a CPU converts virtual addresses into physical addresses and uses the converted physical addresses for referring to instructions and data in the program that has been loaded in the main memory unit.

At present, the operating speed of a main memory unit is slower as compared to the operating speed of a CPU. Moreover, a CPU and a main memory unit are spaced apart by a large distance. Thus, an access to a main memory unit from a CPU consumes a substantial processing time. Furthermore, since the conversion table for conversion of virtual addresses to physical addresses is placed in a main memory unit, it takes time if the conversion table is referred every time an instruction or data is to be retrieved from a program.

Given that factor, an information processing apparatus is in use in which a cache memory that is referred to as a TLB (Translation Look-aside Buffer) and controlled by an LRU (Least Recently Used) is used to register a portion of a conversion table that has been placed in a main memory unit. Then, to convert a virtual address into a physical address, a CPU in that information processing apparatus first refers to the TLB and, only when the intended entry is not found in the TLB, refers to the conversion table stored in the main memory unit. In recent years, an information processing apparatus is being used in which a full associative TLB and a 2-way set associative TLB are placed on the same hierarchy (e.g., see Japanese Laid-open Patent Publication No. 2005-346358).

Given below is the description of an information processing apparatus in which a full associative TLB and a 2-way set associative TLB are placed on the same hierarchy. FIG. 10 is a schematic diagram of a conventional information processing apparatus in which a full associative TLB and a 2-way set associative TLB are placed on the same hierarchy. Consider an architecture, as illustrated in FIG. 10, in which a full associative TLB and a 2-way set associative TLB are placed on the same hierarchy and that can process a plurality of page sizes. In that architecture, no entry is registered at the start in any of the two TLBs. Then, for the first time of TLB registration, an entry is registered in a way 0 of the sTLB as well as the fTLB according to an LRU. Regarding TLB registration according to the present invention, it is assumed that all entries are registered in a set associative TLB.

When a program is executed in such a configuration, a CPU refers to both the full associative TLB and the 2-way set associative TLB to perform conversion of a virtual address into a physical address (entry A). If a conversion table for conversion of virtual addresses is not registered in either of the two TLBs, then the CPU accesses a main memory unit for referring to a conversion table placed therein, reads the conversion table (entry A) corresponding to the target virtual address for conversion from the main memory unit, and registers it in the 2-way set associative TLB (see (1) in FIG. 10).

Subsequently, if a TLB miss occurs when the CPU refers to the TLBs for a virtual address in the same cache line of the set associative TLB, then the CPU performs an operation identical to (1) in FIG. 10 and registers the intended entry as an entry B in a way 1 of the set associative TLB (see (2) in FIG. 10). Moreover, if a TLB miss occurs when the CPU subsequently refers to the TLBs for a virtual address in the same cache line of the set associative TLB, then the CPU performs an operation identical to (1) in FIG. 10 and registers the intended entry as an entry C in the way 0 of the set associative TLB according to an LRU. However, in that case, the entry A that has already been registered is evicted from the set associative TLB (see (3) in FIG. 10).

Furthermore, if a TLB miss occurs when the CPU subsequently refers to the TLBs for a virtual address in the same cache line of the set associative TLB, then the CPU performs an operation identical to (1) in FIG. 10 and registers the intended entry as an entry D in the way 1 of the set associative TLB according to an LRU. However, in that case, the entry B that has already been registered is evicted from the set associative TLB (see (4) in FIG. 10).

However, in the abovementioned conventional technology, thrashing occurs thereby causing degradation in the processing performance. More particularly, a set associative TLB generally employs a set associative system of a number of ways. For example, consider a case when a plurality of processes is concurrently executed and the virtual addresses that compete for a cache line accessing a cache locally exceed the number of ways of a set associative TLB. In that case, TLB rewriting or, in other words, thrashing occurs. That forces the CPU to access the conversion table placed in the main memory unit. As a result, there is degradation in the processing performance.

SUMMARY

According to an aspect of an embodiment of the invention, an arithmetic processing apparatus includes a plurality of TLBs holding as entries a portion of a conversion table for conversion of virtual addresses into physical addresses that has been placed in a main memory unit, an entry registration determining unit that, while registering an entry output from the main memory unit in any one of a plurality of TLBs, determines whether an entry has already been registered in an area of a TLB as registration destination, and a relocation control unit that, when the entry registration determining unit determines that an entry has already been registered in the area of the TLB as registration destination, evicts the entry that has already been registered and registers evicted entry in other TLB.

According to another aspect of an embodiment of the invention, a computer readable storage medium includes instructions for controlling an entry, wherein the instructions, when executed by a computer as an information processing apparatus, which includes a plurality of TLBs holding as entries a portion of a conversion table for conversion of virtual addresses into physical addresses that has been placed in a main memory unit, cause the computer to perform determining, while registering an entry output from the main memory unit in any one of a plurality of TLBs, whether an entry has already been registered in an area of a TLB as registration destination and when it is determined in the determining that an entry has already been registered in the area of the TLB as registration destination, evicting the entry that has already been registered and registering the evicted entry in other TLB.

According to still another aspect of an embodiment of the invention, an entry control method that is suitable to an information processing apparatus including a plurality of TLBs holding as entries a portion of a conversion table for conversion of virtual addresses into physical addresses that has been placed in a main memory unit, the entry control method includes determining, while registering an entry output from the main memory unit in any one of a plurality of TLBs, whether an entry has already been registered in an area of a TLB as registration destination, and when it is determined in the determining that an entry has already been registered in the area of the TLB as registration destination, evicting the entry that has already been registered and registering the evicted entry in other TLB.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a schematic diagram for explaining a sequence of entry registration with respect to an fTLB having divided areas in the arithmetic processing apparatus according to a fifth embodiment;

DESCRIPTION OF EMBODIMENT(S)

Preferred embodiments of the present invention will be explained with reference to accompanying drawings.

The following description includes an outline and features of an arithmetic processing apparatus according to the present embodiment, a configuration of the arithmetic processing apparatus, and a sequence of operations performed in the arithmetic processing apparatus, followed by various modifications of the present embodiment.

[a] First Embodiment

Outline and features of the arithmetic processing apparatus

Figure 1:
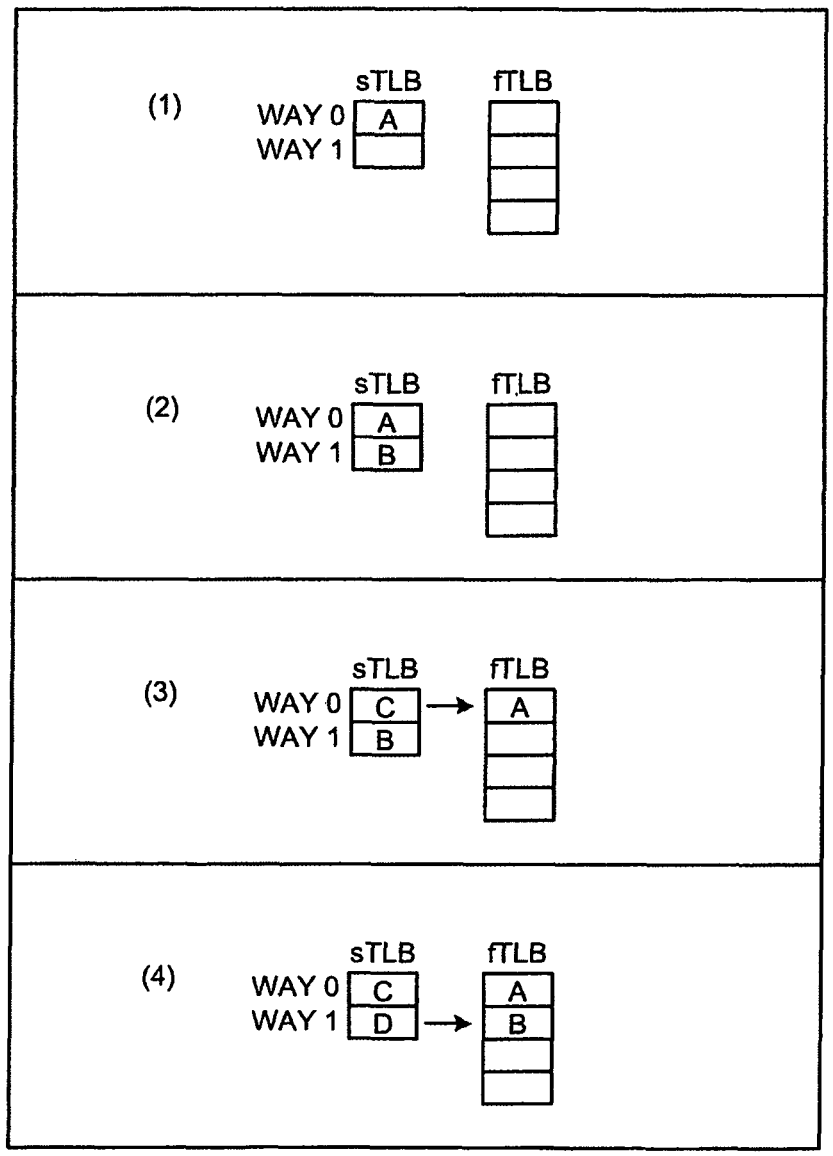
FIG. 1 is a schematic diagram for explaining an outline and features of an arithmetic processing apparatus according to a first embodiment.

Firstly, an outline and features of an arithmetic processing apparatus according to a first embodiment are explained with reference to FIG. 1. FIG. 1 is a schematic diagram for explaining an outline and features of the arithmetic processing apparatus according to the first embodiment.

As illustrated in FIG. 1, the arithmetic processing apparatus includes a 2-way sTLB (set associative TLB) and an fTLB (full associative TLB) that are placed on the same hierarchy controlled by an LRU. Generally, an sTLB is allocated to areas used for programs written by the user of an arithmetic processing apparatus; while an fTLB is allocated to areas used for control programs of an OS (Operating System) or the like.

A CPU (e.g., a processing unit or an instruction control unit) of the arithmetic processing unit stores a portion of a conversion table for conversion of virtual addresses into physical addresses that has been placed in a main memory unit as entries into the TLBs. Then, while converting a virtual address corresponding to data that has been referred to by a program into a physical address, the CPU first refers to the TLBs and, only if the intended entry is not found in the TLBs, refers to the conversion table stored in the main memory unit. Subsequently, the CPU reads the intended entry, which was not found in the TLBs, from the main memory unit and registers it in a TLB. Herein, at the start, no entry is registered in any of the two TLBs. Then, for the first time of TLB registration, an entry is registered in the way 0 according to an LRU. Meanwhile, regarding TLB registration according to the present embodiment, it is assumed that all entries are registered in the sTLB.

Thus, as an outline, the arithmetic processing apparatus includes the sTLB and the fTLB that hold as entries a portion of the conversion table for conversion of virtual addresses into physical addresses that has been placed in the main memory unit. Moreover, the arithmetic processing apparatus is characterized by preventing thrashing from occurring and enabling achieving enhancement in the processing performance.

Given below is the detailed description regarding the main features of the arithmetic processing apparatus. While registering an entry that has been output from the main memory unit in any one of a plurality of TLBs, the arithmetic processing apparatus determines whether an entry has already been registered in an area of a TLB as the registration destination. If no entry is registered in the area of the TLB as the registration destination, the arithmetic processing apparatus registers the entry output from the main memory unit in the TLB (see (1) in FIG. 1). More particularly, the arithmetic processing unit refers to both the fTLB and the sTLB for performing conversion of a virtual address into a physical address (entry A). Since the entry A has not been registered in either of the two TLBs, the arithmetic processing apparatus reads the entry A from the main memory unit. Then, the arithmetic processing apparatus determines whether an entry has already been registered in a way 0 of the sTLB as the registration destination for registering the entry A read from the main memory unit. Since no entry has been registered in the way 0 of the sTLB, the arithmetic processing apparatus registers the entry A, which is read from the main memory unit, in the way 0 of the sTLB.

Subsequently, in an identical manner, the arithmetic processing apparatus refers to both the fTLB and the sTLB for performing conversion of a virtual address into a physical address (entry B). Since the entry B has not been registered in either of the two TLBs, the arithmetic processing apparatus reads the entry B from the main memory unit. Then, the arithmetic processing apparatus determines whether an entry has already been registered in a way 1 of the sTLB as the registration destination for registering the entry B read from the main memory unit (see (2) in FIG. 1). Since no entry has been registered in the way 1 of the sTLB, the arithmetic processing apparatus registers the entry B, which is read from the main memory unit, in the way 1 of the sTLB.

Subsequently, in an identical manner, the arithmetic processing apparatus refers to both the fTLB and the sTLB for performing conversion of a virtual address into a physical address (entry C). Since the entry C has not been registered in any of the two TLBs, the arithmetic processing apparatus reads the entry C from the main memory unit. Then, the arithmetic processing apparatus determines whether an entry has already been registered in the way 0 of the sTLB as the registration destination for registering the entry C. If it is determined that an entry has already been registered in the way 0 of the sTLB, then the arithmetic processing apparatus evicts that already-registered entry and registers it in the other TLB (see (3) in FIG. 1).

More particularly, in the abovementioned example, the arithmetic processing apparatus refers to both the fTLB and the sTLB for performing conversion of a virtual address into a physical address (entry C). Since the entry C has not been registered in any of the two TLBs, the arithmetic processing apparatus reads the entry C from the main memory unit. Then, the arithmetic processing apparatus determines, using an LRU, whether an entry has already been registered in the area that, from among the areas corresponding to the entry A and the entry B, has been least referred to. That is, the arithmetic processing apparatus determines whether an entry has already been registered in the way 0 of the sTLB in which the entry A was registered most previously. Herein, since the entry A has already been registered in the way 0, the arithmetic processing apparatus evicts the entry A and registers it in the way 0 of the fTLB having the smallest area number from among the empty areas of the fTLB. Then, the arithmetic processing apparatus registers the entry C, which is read from the main memory unit, in the way 0 of the sTLB from which the entry A was evicted.

Subsequently, in an identical manner, the arithmetic processing apparatus refers to both the fTLB and the sTLB for performing conversion of a virtual address into a physical address (entry D). Since the entry D has not been registered in any of the two TLBs, the arithmetic processing apparatus reads the entry D from the main memory unit. Then, the arithmetic processing apparatus determines whether an entry has already been registered in the way 1 of the sTLB as the registration destination for registering the entry D. If it is determined that an entry has already been registered in the way 1 of the sTLB, then the arithmetic processing apparatus evicts that already-registered entry and registers it in the other TLB (see (4) in FIG. 1).

More particularly, in the abovementioned example, the arithmetic processing apparatus refers to both the fTLB and the sTLB for performing conversion of a virtual address into a physical address (entry D). Since the entry D has not been registered in any of the two TLBs, the arithmetic processing apparatus reads the entry D from the main memory unit. Then, the arithmetic processing apparatus determines, using an LRU, whether an entry has already been registered in the area that, from among the areas corresponding to the entry A and the entry B, has been least referred to. That is, the arithmetic processing apparatus determines whether an entry has already been registered in the way 1 of the sTLB in which the entry B was registered most previously. Herein, since the entry B has already been registered in the way 1, the arithmetic processing apparatus evicts the entry B and registers it in the way 1 of the fTLB. The way 1 of the fTLB has the smallest area number from among the empty areas of the fTLB. Then, the arithmetic processing apparatus registers the entry D, which is read from the main memory unit, in the way 1 of the sTLB from which the entry B was evicted.

In this way, the arithmetic processing apparatus according to the first embodiment is able to evict entries registered in the sTLB and register them in the fTLB. That, as described above in the main features, prevents thrashing from occurring and enables achieving enhancement in the processing performance.

Configuration of the Arithmetic Processing Apparatus

Figure 2:
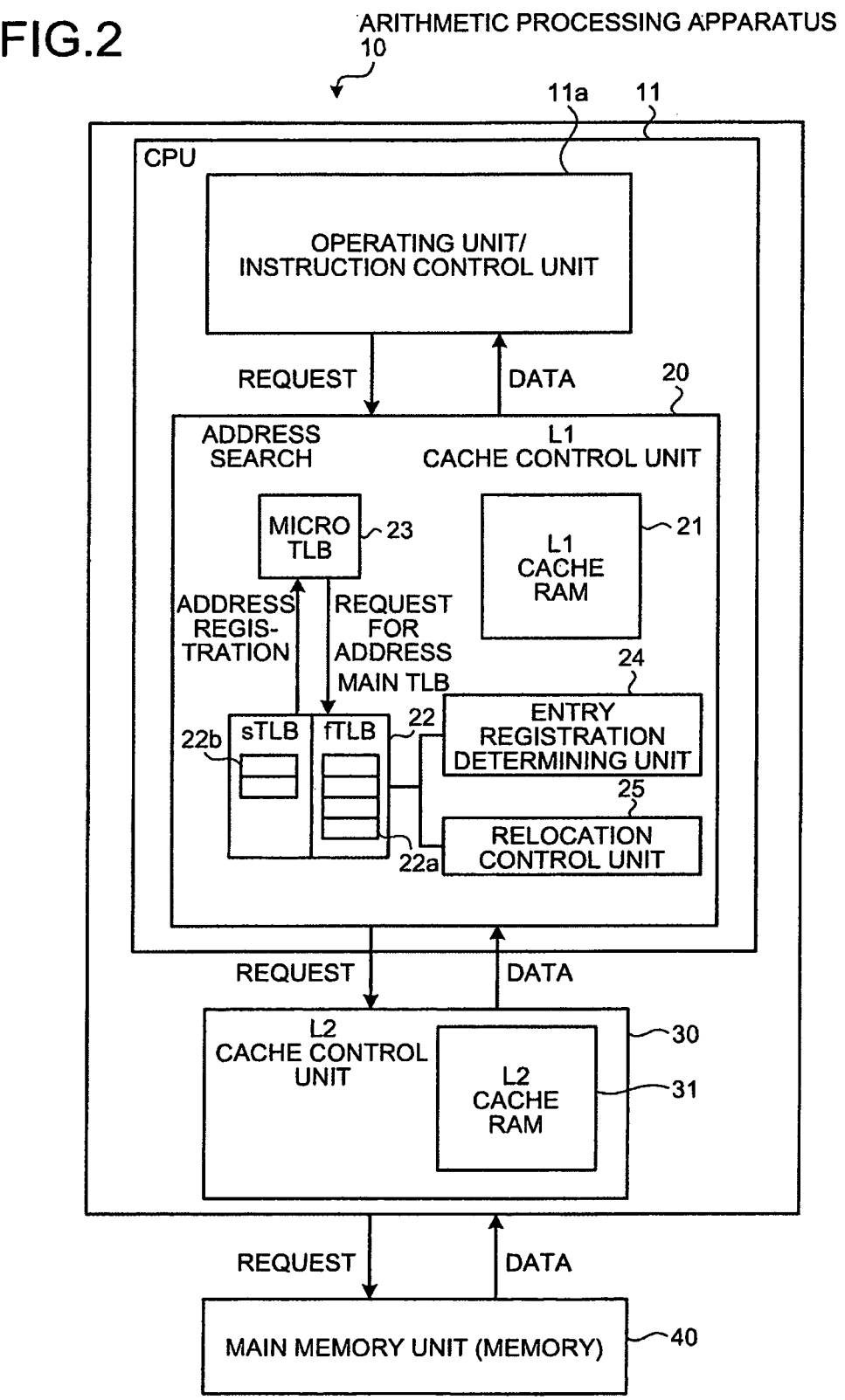
FIG. 2 is a block diagram of a configuration of the arithmetic processing apparatus according to the first embodiment.

Given below is the description with reference to FIG. 2 of a configuration of the arithmetic processing apparatus illustrated in FIG. 1. FIG. 2 is a block diagram of a configuration of the arithmetic processing apparatus according to the first embodiment. As illustrated in FIG. 2, an arithmetic processing apparatus 10 includes a CPU 11, an L1 cache control unit 20, an L2 cache control unit 30, and a main memory unit 40.

The CPU 11 is a processing unit that executes various programs stored in the main memory unit 40. Regarding the aspects of close association with the present embodiment, the CPU 11 includes an operating unit/instruction control unit 11a and the L1 cache control unit 20.

The operating unit/instruction control unit 11a outputs instructions regarding data writing or data reading according to the arithmetic processing performed by the CPU 11. Moreover, the operating unit/instruction control unit 11a obtains necessary data from a micro TLB 23, a main TLB 22, an L1 cache RAM 21, an L2 cache RAM 31, or the main memory unit 40 described later, and performs arithmetic processing on the obtained data.

The L1 cache control unit 20 is a processing unit that, when a virtual address is received from the operating unit/instruction control unit 11a, obtains corresponding data from the L1 cache RAM 21 and outputs it to the operating unit/instruction control unit 11a. If the corresponding data is not found in the L1 cache RAM 21, the L1 cache control unit 20 outputs an L2 cache access address to the L2 cache control unit 30. Regarding the aspects of close association with the present embodiment, the L1 cache control unit 20 includes the L1 cache RAM 21, the main TLB 22, the micro TLB 23, an entry registration determining unit 24, and a relocation control unit 25.

The L1 cache RAM 21 is a high-speed low-capacity memory integrated with or mounted on the same module as that of the CPU 11 and is used to store frequently-used data. That is, the L1 cache RAM 21 is used to temporarily store instructions and data processed by the CPU 11. Thus, until new data is supplied by the main memory unit 40, the L1 cache RAM 21 can supply a certain volume of data to the CPU 11. That enables the CPU 11 to carry on the processing.

The main TLB 22 holds as entries a portion of a conversion table for conversion of virtual addresses into physical addresses that has been placed in the main memory unit.

Regarding the aspects of close association with the present embodiment, the main TLB 22 includes an sTLB 22b and an fTLB 22a. Herein, at the start, no entry is registered in any of the two TLBs. Then, for the first time of TLB registration, an entry is registered in the way 0 of the sTLB 22b according to an LRU. Regarding subsequent TLB registration, all entries are registered in the sTLB 22b.

The fTLB 22a stores therein, by employing a full associative system in which there is no sorting according to entry addresses and all lines are considered as search targets, a portion of the conversion table for conversion of virtual addresses into physical addresses that has been placed in the main memory unit as entries.

The sTLB 22b stores therein, by employing an N-way set associative system in which a single entry can be used to store different frame addresses in plurality, frequently-used entries from among the entries registered in the fTLB 22a. The sTLB 22b is illustrated as a TLB of a 2-way set associative system.

The micro TLB 23 is used to store a portion of the conversion table for converting virtual addresses into physical addresses corresponding to the data most recently used by the operating unit/instruction control unit 11a. The entries stored in the micro TLB 23 are those stored in the main TLB 22. By using the micro TLB 23 to store entries most recently used by the operating unit/instruction control unit 11a, it becomes possible to speed up the processing when the operating unit/instruction control unit 11a reuses the same entries.

When an entry output from the main memory unit 40 is to be registered in any one of the plurality of TLBs, the entry registration determining unit 24 determines whether an entry has already been registered in an area of a TLB as the registration destination. As a specific example, consider a case when the operating unit/instruction control unit 11a refers to both the fTLB 22a and the sTLB 22b for performing conversion of a virtual address into a physical address (entry A). In that case, since the entry A has not been registered in either of the two TLBs, the operating unit/instruction control unit 11a reads the entry A from the main memory unit 40. Then, the entry registration determining unit 24 determines whether an entry has already been registered in the way 0 of the sTLB 22b as the registration destination for registering the entry A read from the main memory unit 40.

If it is determined that another entry has already been registered in the way 0 of the sTLB 22b as the registration destination for registering the entry A read from the main memory unit 40, then the entry registration determining unit 24 informs the relocation control unit 25 described later to that effect.

When the entry registration determining unit 24 determines that an entry has already been registered in the area of the TLB as the registration destination, the relocation control unit 25 evicts that already-registered entry from and registers it another TLB. As a specific example, consider a case when the entry A is stored in the way 0 of the sTLB 22b, an entry B is stored in the way 1 of the sTLB 22b, and subsequent TLB registration is performed with respect to the sTLB 22b. Moreover, it is assumed that the fTLB 22a does not have any entry registered therein and the first entry to be registered therein is registered in the way 0 according to an LRU.

Then, further assume that the operating unit/instruction control unit 11a refers to both the fTLB 22a and the sTLB 22b for performing conversion of a virtual address into a physical address (entry C). In that case, since the entry C is not registered in either of the two TLBs, the operating unit/instruction control unit 11a reads the entry C from the main memory unit 40. Then, the entry registration determining unit 24 determines whether an entry has already been registered in the way 0 of the sTLB 22b as the registration destination for registering the entry C. Since it is determined that the entry A is already registered in the way 0 of the sTLB 22b as the registration destination for registering the entry C, the entry registration determining unit 24 informs the relocation control unit 25 to that effect.

Subsequently, the relocation control unit 25 evicts the already-registered entry A and registers it in the way 0 of the fTLB 22a as the other TLB. The way 0 of the fTLB 22a has the smallest area number from among the empty areas of the fTLB 22a. Thus, the relocation control unit 25 performs relocation control of entries. At the same time, the relocation control unit 25 registers the entry C, which is read from the main memory unit 40, in the way 0 of the sTLB 22b.

The L2 cache control unit 30 includes the L2 cache RAM 31. Upon obtaining the L2 cache access address from the L1 cache control unit 20, the L2 cache control unit 30 reads the data corresponding to the obtained L2 cache access address from the L2 cache RAM 31 and outputs the data to the L1 cache control unit 20. The L2 cache RAM 31 is a low-speed memory as compared to the L1 cache RAM 21 but a high-speed memory as compared to the main memory unit 40. Moreover, the L2 cache RAM 31 has higher memory capacity than the L1 cache RAM 21 but lower memory capacity than the main memory unit 40. The L2 cache RAM 31 is used to store the frequently-used data.

The main memory unit 40 is a high-capacity main memory used to store data, instructions, and the conversion table (page table) for conversion of virtual addresses into physical addresses used by the CPU 11. In response to a request from the operating unit/instruction control unit 11a or the L1 cache control unit 20 in the CPU 11 or from the L2 cache control unit 30, the main memory unit 40 sends corresponding data to the source of the request.

Operations in the Arithmetic Processing Apparatus

Figure 3:
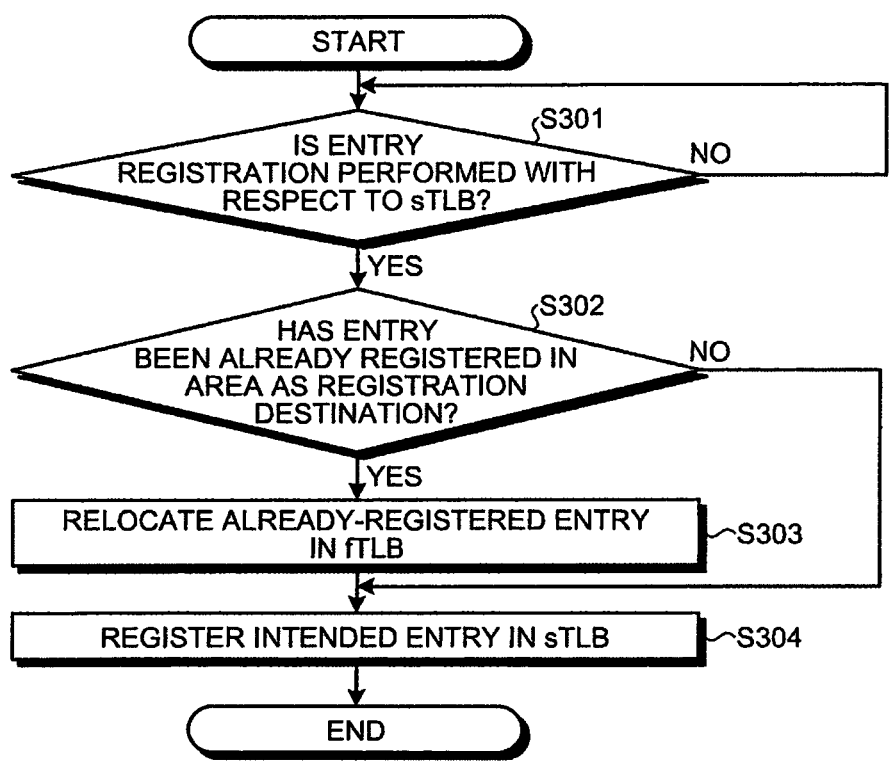
FIG. 3 is a flowchart for explaining a sequence of operations in the arithmetic processing apparatus according to the first embodiment.

Given below is the description with reference to FIG. 3 of operations performed in the arithmetic processing apparatus. FIG. 3 is a flowchart for explaining a sequence of operations in the arithmetic processing apparatus according to the first embodiment.

As illustrated in FIG. 3, when an entry registration request is issued with respect to the sTLB 22b (Yes at Step S301), the entry registration determining unit 24 determines whether an entry has already been registered in an area (e.g., way 0) of the sTLB 22b as the registration destination (Step S302).

If it is determined that an entry has already been registered in the area of the sTLB 22b as the registration destination (Yes at Step S302), then the entry registration determining unit 24 informs the relocation control unit 25 to that effect. Then, the relocation control unit 25 evicts the entry that has already been registered in the area of the sTLB 22b as the registration destination and registers the entry in an area of the fTLB 22a having the smallest area number (e.g., way 0) from among the empty areas of the fTLB 22a. That is, the relocation control unit 25 performs entry relocation (Step S303).

At the same time, the relocation control unit 25 registers the entry read from the main memory unit 40 in the area of the sTLB 22b as the registration destination with respect to which entry relocation is performed (Step S304).

Meanwhile, if it is determined that no entry has been registered in the area of the sTLB 22b as the registration destination (No at Step S302), then the relocation control unit 25 registers the entry read from the main memory unit 40 in the area of the sTLB 22b.

Effect of the First Embodiment

In this way, according to the first embodiment, while registering an entry that has been output from the main memory unit 40 in the sTLB 22b, it is first determined whether an entry has already been registered in an area of the sTLB 22b as the registration destination. If it is determined that an entry has already been registered in the area of the sTLB 22b as the registration destination, then that already-registered entry is evicted therefrom and registered in the fTLB 22a. That prevents thrashing from occurring and enables achieving enhancement in the processing performance.

For example, consider a case when the entry A and the entry B are respectively registered in the way 0 and the way 1 of the sTLB 22b, while no entry is registered in the fTLB 22a. Moreover, assume that the operating unit/instruction control unit 11a reads the entries C, B, and A. In that case, since the entry C is not registered in either of the sTLB 22b and the fTLB 22a, the operating unit/instruction control unit 11a reads the entry C from the main memory unit 40 and, while performing corresponding processing, registers the entry C in the way 0 of the sTLB 22b. Then, since the entry B is registered in the way 1 of the sTLB 22b, the operating unit/instruction control unit 11a reads the entry B from the way 1 of the sTLB 22b and performs corresponding processing. Subsequently, since the entry A has been evicted from the sTLB 22b for the registration of the entry C, the operating unit/instruction control unit 11a reads the entry A from the main memory unit 40, performs corresponding processing, and registers the entry C in the way 0 of the sTLB 22b.

In this way, to process a particular entry that was registered at the start in the sTLB 22b but has been evicted therefrom, it becomes necessary to read that entry from the main memory unit 40 for processing. That causes thrashing. However, by implementing the present embodiment, since the entry C is not registered in either of the sTLB 22b and the fTLB 22a, the operating unit/instruction control unit 11a reads the entry C from the main memory unit 40, performs corresponding processing, relocates the entry A from the way 0 of the sTLB 22b as the registration destination for registering the entry C, to the fTLB 22a, and then registers the entry C in the way 0 of the sTLB 22b. Thus, while subsequently reading the entry A, the operating unit/instruction control unit 11a need not refer to the main memory unit 40 but can read the entry A from the fTLB 22a. That prevents thrashing from occurring and enables achieving enhancement in the processing performance.

Meanwhile, to prevent thrashing from occurring, the areas (number of ways) of the sTLB 22b or the fTLB 22a can also be increased. However, such a measure leads to an increase in the physical dimension that in turn increases the power consumption. However, by implementing the present embodiment, there is no need to increase the areas (number of ways) of the sTLB 22b or the fTLB 22a, or dispose an additional TLB. That contributes in reducing the physical dimension as well as the power consumption.

[b] Second Embodiment

In the first embodiment, the description is given for a case when all entries evicted from an sTLB are registered in an fTLB. However, a second embodiment is not limited to that case. That is, from among the entries evicted from an sTLB, only those entries for which no error is detected can be registered in an fTLB.

Figure 4:
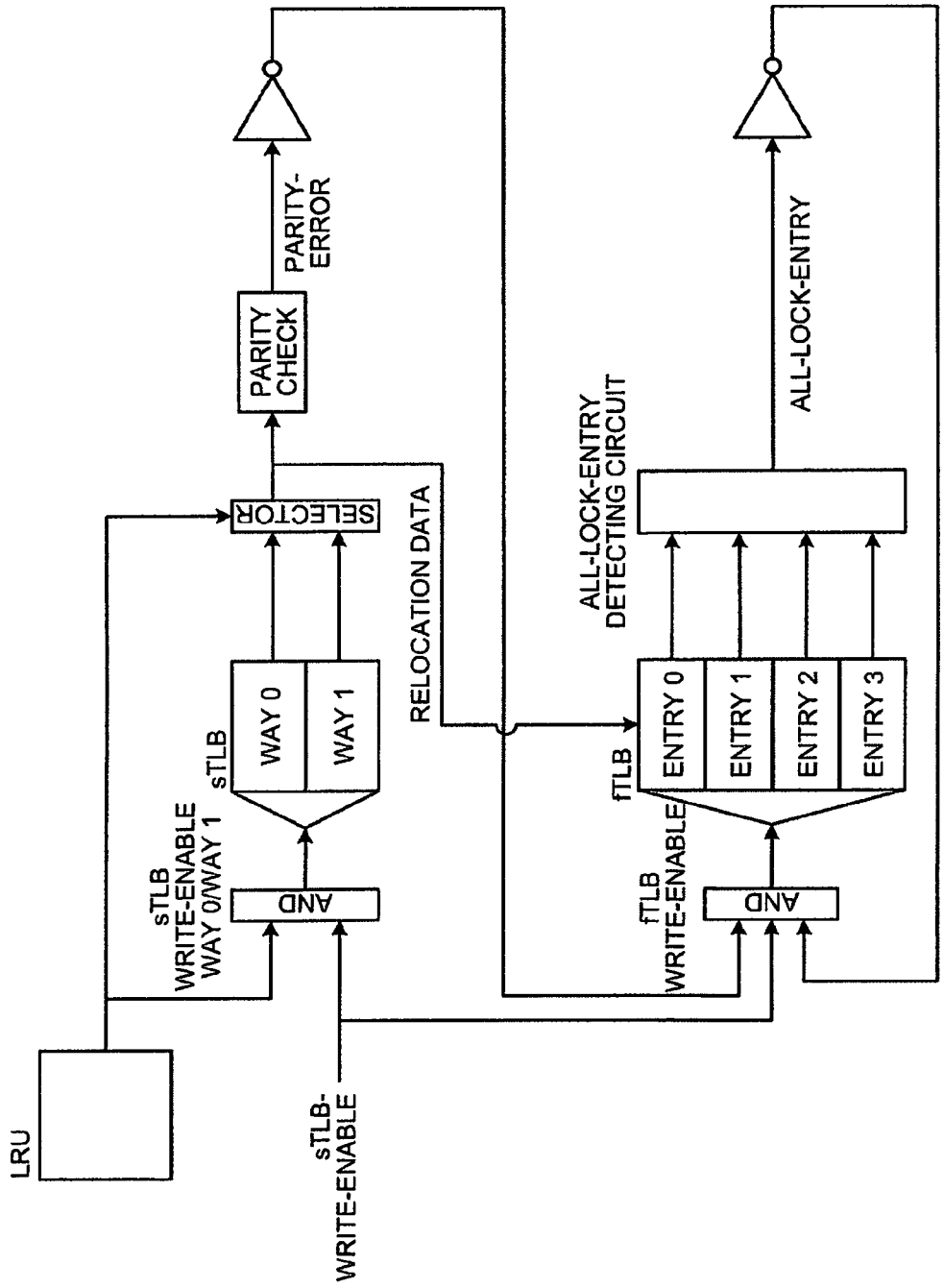
FIG. 4 is a schematic diagram of a circuit configuration of the arithmetic processing apparatus according to a second embodiment.

Thus, in the second embodiment, the description is given with reference to FIG. 4 for a case when, from among the entries evicted from an sTLB, only those entries for which no error is detected are registered in an fTLB. FIG. 4 is a schematic diagram of a circuit configuration of the arithmetic processing apparatus according to the second embodiment.

As illustrated in FIG. 4, an sTLB and an fTLB are controlled by an LRU. When sTLB-write-enable is input to an AND circuit of the sTLB, the LRU determines an area for registration.

If an entry is already registered in the determined area, then that entry is output to a selector and then input to the fTLB as relocation data. Moreover, the entry output from the sTLB is input to a parity check circuit in which parity checking is performed to determine whether an error has occurred in that entry.

Subsequently, error information indicating whether or not an error has occurred is input to an AND circuit of the fTLB. Depending on the error information, the entry that has been input to the fTLB, and entry information on entries that have already been registered in the fTLB; an area of the fTLB is determined for registration and the entry that has been input to the fTLB is registered in that area. However, if the error information input to the fTLB indicates that an error has occurred, then the AND circuit discards the entry output from the sTLB. Thus, only if the error information input to the fTLB indicates that no error has occurred, then the entry output from the sTLB is registered in the fTLB.

In this way, according to the second embodiment, If it is determined that an entry has already been registered in an area of a TLB as the registration destination, then it is further determined whether an error has occurred in that entry. If an error has occurred, then that entry is discarded without being registered in another TLB. If no error has occurred, then that entry is registered in another TLB. That enables avoiding unnecessary area usage.

For example, assume that an entry having an error is registered and it is necessary to read the entry upon being registered. In that case, an error of incorrect read value may occur while reading the entry or the entry may not be readable in the first place. Thus, eventually the entry needs to be read from the main memory unit. That causes extra processing load. Thus, in light of the possibility that there may be entries that are not readable or that cause an error upon being read, it is determined whether an entry evicted from the sTLB has an error and only such entries that do not have any error are registered in the fTLB. That enables avoiding unnecessary area usage.

[c] Third Embodiment

In the first embodiment, the description is given for a case when an entry evicted from an sTLB is registered as it is in an fTLB. However, a third embodiment is not limited to that case. That is, while registering an entry that has been evicted from an sTLB in an fTLB, an identifier can be appended to the entry indicating that the entry is not read from a main memory unit but evicted from a TLB.

Figure 5:
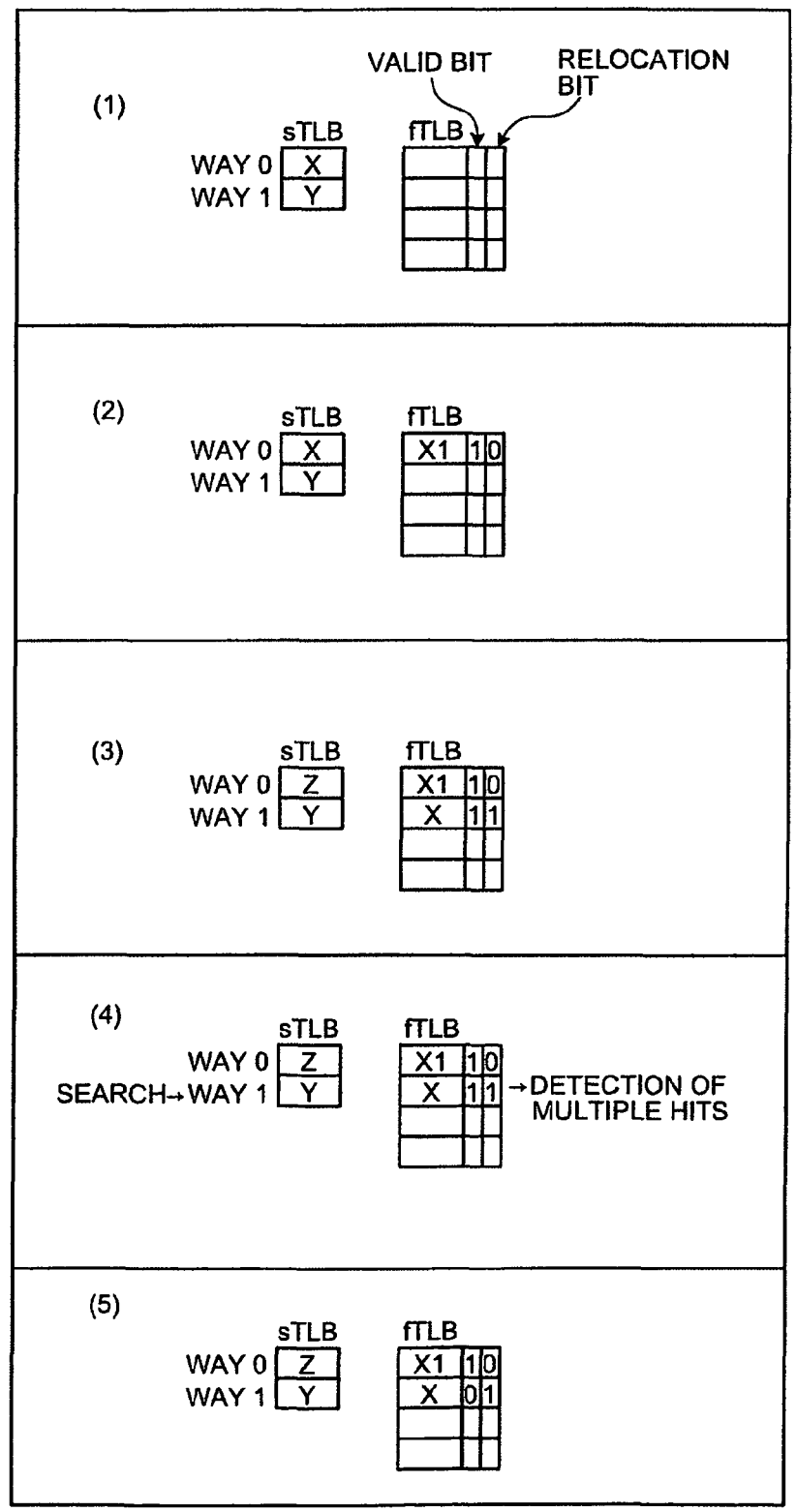
FIG. 5 is a schematic diagram for explaining a sequence of entry registration with respect to an sTLB and an fTLB in the arithmetic processing apparatus according to a third embodiment.

Thus, in the third embodiment, the description is given for a case in which, while registering an entry that has been evicted from an sTLB in an fTLB, an identifier is appended to the entry indicating that the entry is not read from a main memory unit but evicted from a TLB. FIG. 5 is a schematic diagram for explaining a sequence of entry registration with respect to an sTLB and an fTLB in the arithmetic processing apparatus according to the third embodiment. Regarding each bit illustrated in FIG. 5, "1" indicates a valid state and "0" indicates an invalid state.

Herein, it is assumed that an sTLB illustrated in FIG. 5 is a 2-way set associative TLB in which entries of 8K page size can be registered. Similarly, it is assumed that entries of 64K page size can be registered in an fTLB. Moreover, the fTLB includes, for each entry registered therein, a valid bit indicating whether the corresponding entry is valid and a relocation bit indicating whether the corresponding entry has been output from another TLB. In the way 0 of the sTLB is registered an entry X of 8K page size and in the way 1 of the sTLB is registered an entry Y of 8K page size (see (1) in FIG. 5). Meanwhile, in each of the valid bit and the relocation bit, "1" is set for a valid state and "0" is set for an invalid state.

In that situation, consider a case when an operating unit/instruction control unit in a CPU has to access an entry X1 that includes the address X as part thereof. In that case, since the entry X1 is not registered in either of the sTLB and the fTLB, the arithmetic processing apparatus reads the address X1 (page size=64K) from a main memory unit and sends it to the operating unit/instruction control unit. Subsequently, since the address X1 is read from the main memory unit as the most recently used address, the arithmetic processing apparatus registers the read address X1 in the way 0 of the fTLB with the corresponding valid bit set to "1" and the corresponding relocation bit set to "0" (see (2) in FIG. 5).

Subsequently, assume that the operating unit/instruction control unit in the CPU has to access an address Z. In that case, since the entry Z is not registered in either of the sTLB and the fTLB, the arithmetic processing apparatus reads the address Z (page size=8K) from the main memory unit and sends it to the operating unit/instruction control unit. Subsequently, to register the address Z in the way 0 of the sTLB, the arithmetic processing apparatus determines whether another entry has already been registered in the way 0 of the sTLB.

Herein, since the entry X has already been registered in the way 0 of the sTLB, the arithmetic processing apparatus evicts the already-registered entry X and registers it in the way 1 of the fTLB with the corresponding relocation bit set to "1" and the corresponding valid bit set to "0" as identifiers indicating that the entry X is not directly output from the main memory unit but evicted from a TLB (see (3) in FIG. 5).

In that situation, assume that the operating unit/instruction control unit in the CPU accesses the address X. Then, since the entry X1 including the address X is registered along with the entry X in the fTLB, the arithmetic processing apparatus detects multiple hits for the entry X. If same-page entries including the entry X, which has been evicted from the sTLB, are registered in plurality in the fTLB leading to detection of multiple hits, then the entry X is removed from the fTLB. That is, the valid bit corresponding to the entry X is set to "0" in the fTLB (see (4) and (5) in FIG. 5).

In this way, according to the third embodiment, if it is determined that an entry has been already registered in an area of the sTLB as the registration destination, then the already-registered entry is evicted therefrom and registered in the fTLB along with identifiers indicating that the entry is not directly output from the main memory unit but evicted from the sTLB. Because of that, it becomes possible to easily determine whether an entry registered in the fTLB has been registered from the main memory unit or relocated from another TLB.

Moreover, according to the third embodiment, if same-page entries including an entry that has been evicted from the sTLB are registered in plurality leading to detection of multiple hits in a plurality of TLBs having a plurality of entries registered therein, then the entry that has been evicted from the sTLB is removed. As a result, any mismatch attributed to multiple hits can be prevented.

[d] Fourth Embodiment

In the first three embodiments, the description is given for a case when an entry evicted from an sTLB is registered in an fTLB having a free area. However, a fourth embodiment is not limited to that case. That is, an entry evicted from an sTLB can be registered in an fTLB having no free area.

Figure 6:
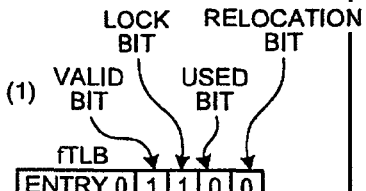
FIG. 6 is a schematic diagram for explaining a sequence of entry registration with respect to an fTLB in the arithmetic processing apparatus according to a fourth embodiment.

Thus, in the fourth embodiment, the description is given with reference to FIG. 6 for a case when an entry evicted from an sTLB is registered in an fTLB having no free area. FIG. 6 is a schematic diagram for explaining a sequence of entry registration with respect to an fTLB in the arithmetic processing apparatus according to the fourth embodiment. Regarding each bit illustrated in FIG. 6, "1" indicates a valid state and "0" indicates an invalid state.

The fTLB illustrated in FIG. 6 has eight areas and includes, for an entry registered in each area, a valid bit indicating whether the corresponding entry is valid (considered as "valid" when read by another TLB), a lock bit indicating whether the corresponding entry is locked so as to prevent its eviction from a TLB, a used bit indicating whether the corresponding entry is used (considered as "used" when read by another TLB), and a relocation bit indicating whether the corresponding entry has been output from another TLB.

As illustrated in (1) in FIG. 6, the fTLB holds in each area an entry having an entry name, a valid bit, a lock bit, a used bit, and a relocation bit in that order. The entries held by the fTLB are: "entry 0, 1, 1, 0, 0"; "entry 1, 0, 0, 0, 0"; "entry 2, 1, 1, 1, 0"; "entry 3, 1, 0, 1, 0"; "entry 4, 1, 1, 0, 0"; "entry 5, 0, 0, 0, 0"; "entry 6, 1, 1, 1, 0"; and "entry 7, 1, 0, 0, 0".

In that situation, consider a case of registering an entry that has been evicted from the sTLB in the fTLB. In that case, the arithmetic processing apparatus registers the evicted entry with the relocation bit validated over the entry having the smallest entry number from among the entries that are already registered in the fTLB and that have the respective valid bit set to OFF. If the valid bit for all of the registered entries is set to ON, then the arithmetic processing apparatus registers the evicted entry with the relocation bit validated over the entry having the smallest entry number from among the entries that have the respective lock bit and the respective used bit set to OFF. Moreover, if all of the registered entries have the respective valid bit set to ON and have either one of the respective lock bit and the respective used bit set to ON, then the arithmetic processing apparatus sets the used bit for all entries to OFF and then registers the evicted entry with the relocation bit validated over the entry having the smallest entry number from among the entries that have the respective lock bit and the respective used bit set to OFF.

As a specific example, consider a case of registering an entry 8 that has been evicted from the sTLB in the fTLB. In that case, the arithmetic processing apparatus registers "entry 8, 1, 0, 1, 1" over the area in which the entry 1 was registered as having the smallest entry number from among the entries that have the respective valid bit set to OFF (see (2) in FIG. 6). Subsequently, to register an entry 9 that has been evicted from the sTLB in the fTLB, the arithmetic processing unit registers "entry 9, 1, 0, 1, 1" over the area in which the entry 5 was registered as having the smallest entry number from among the entries having the respective valid bit set to OFF (see (3) in FIG. 6).

Subsequently, consider a case of registering an entry 10 that has been evicted from the sTLB in the fTLB. In that case, since all of the already-registered entries in the fTLB have the respective valid bit set to ON, the arithmetic processing apparatus registers "entry 10, 1, 0, 1, 1" over the area in which the entry 7 was registered as having the smallest entry number from among the entries that have the respective lock bit and the respective used bit set to OFF (see (4) in FIG. 6).

Subsequently, consider a case of registering an entry 11 that has been evicted from the sTLB in the fTLB. In that case, since all of the already-registered entries in the fTLB have the respective valid bit set to ON and have either one of the respective lock bit and the respective used bit set to ON, the arithmetic processing apparatus sets the used bit for all entries to OFF (see (5) in FIG. 6). That is, the arithmetic processing apparatus changes "entry 0, 1, 1, 0, 0"; "entry 8, 1, 0, 1, 1"; "entry 2, 1, 1, 1, 0"; "entry 3, 1, 0, 1, 0"; "entry 4, 1, 1, 0, 0"; "entry 9, 1, 0, 1, 1"; "entry 6, 1, 1, 1, 0"; and "entry 10, 1, 0, 1, 1" held by the fTLB to "entry 0, 1, 1, 0, 0"; "entry 8, 1, 0, 0, 1"; "entry 2, 1, 1, 0, 0"; "entry 3, 1, 0, 0, 0"; "entry 4, 1, 1, 0, 0"; "entry 9, 1, 0, 0, 1"; "entry 6, 1, 1, 0, 0"; and "entry 10, 1, 0, 0, 1", respectively. Then, the arithmetic processing apparatus registers "entry 11, 1, 0, 1, 1" over the area in which the entry 8 was registered as having the smallest entry number from among the entries that have the respective lock bit and the respective used bit set to OFF (see (6) in FIG. 6).

For each entry subsequently evicted from the sTLB, the arithmetic processing apparatus registers, in an identical manner to (4) in FIG. 6, the evicted entry over that area in the fTLB in which an entry was registered as having the smallest entry number from among the entries that have the respective lock bit and the respective used bit set to OFF, because all of the already-registered entries in the fTLB have the respective valid bit set to ON (see (6) to (9) in FIG. 6). Subsequently, when the valid bit for each of the already-registered entries becomes ON as well as when either one of the lock bit and the used bit for each of the already-registered entries becomes ON, the arithmetic processing apparatus sets the used bit for all entries to OFF and then registers an evicted entry over the entry having the smallest entry number from among the entries that have the respective lock bit and the respective used bit set to OFF.

In this way, according to the fourth embodiment, the fTLB includes, for each entry registered therein, a valid bit that indicates whether the corresponding entry is valid; a lock bit that indicates whether the corresponding entry is locked so as to prevent its eviction from a TLB; a used bit that indicates whether the corresponding entry is used; and a relocation bit that indicates whether the corresponding entry has been output from another TLB. If it is determined that an entry has already been registered in an area of the sTLB as the registration destination for registering an entry read from the main memory unit, then the already-registered entry in the sTLB is evicted therefrom and registered in the fTLB. At that time, the evicted entry is registered with the corresponding relocation bit validated over the entry having the smallest entry number from among the entries that are already registered in the fTLB and that have the respective valid bit set to OFF. If the valid bit for all of the registered entries is set to ON, then the evicted entry is registered over the entry having the smallest entry number from among the entries that have the respective lock bit and the respective used bit set to OFF. Moreover, if all of the registered entries have the respective valid bit set to ON and have either one of the respective lock bit and the respective used bit set to ON, the used bit for all entries is set to OFF and then the evicted entry is registered over the entry having the smallest entry number from among the entries that have the respective lock bit and the respective used bit set to OFF. Because of that, even when the fTLB holds three different types of entries, namely, lock-type entries that cannot be evicted from the fTLB, unlock-type entries that have been registered directly from the main memory unit, and relocation-type entries that have been output from the sTLB, it is still possible to prevent thrashing from occurring and thus enhance the processing performance.

[e] Fifth Embodiment

In the first four embodiments, the description is given for a case in which registration (relocation) of an entry that has been evicted from an sTLB is performed with respect to all areas of an fTLB. However, a fifth embodiment is not limited to that case. That is, an entry evicted from an sTLB can be registered (relocated) only in a specified area of the areas of an fTLB.

Thus, in the fifth embodiment, the description is given with reference to FIG. 7 for a case in which an entry that has been evicted from an sTLB is registered (relocated) in an fTLB that is divided into direct registration areas used to register entries that have been read directly from a main memory unit and relocation registration areas (hereinafter also referred to as relocation areas) used to register entries that have been relocated from another TLB. FIG. 7 is a schematic diagram for explaining a sequence of entry registration with respect to an fTLB having divided areas in the arithmetic processing apparatus according to the fifth embodiment. Regarding each bit illustrated in FIG. 7, "1" indicates a valid state and "0" indicates an invalid state.

Identical to the fourth embodiment, The fTLB illustrated in FIG. 7 has eight areas and includes, for an entry registered in each area, a valid bit indicating whether the corresponding entry is valid, a lock bit indicating whether the corresponding entry is locked so as to prevent its eviction from a TLB, a used bit indicating whether the corresponding entry is used, and a relocation bit indicating whether the corresponding entry has been output from another TLB.

More particularly, as illustrated in (1) in FIG. 7, the fTLB holds in each area an entry having an entry name, a valid bit, a lock bit, a used bit, and a relocation bit in that order. The entries held by the fTLB are: "entry 0, 1, 1, 0, 0"; "entry 1, 0, 0, 0, 0"; "entry 2, 1, 1, 1, 0"; "entry 3, 1, 0, 1, 0"; "entry 4, 1, 1, 0, 0"; "entry 5, 0, 0, 0, 0"; "entry 6, 1, 1, 1, 0"; and "entry 7, 1, 0, 0, 0".

However, unlike in the fourth embodiment, the four areas corresponding to the entries 0 to 3 are specified as direct registration areas and used to register entries that have been read directly from the main memory unit; while the four areas corresponding to the entries 4 to 7 are specified as relocation registration areas and used to register entries that have been relocated from another TLB. When a signal that identifies direct registration is ON, the used bit for all of the entries 4 to 7 are treated as set to ON (in practice, the used bit may not be ON); while when a signal that identifies relocation registration is ON, the used bit for all of the entries 0 to 3 are treated as set to ON (in practice, the used bit may not be ON).

In that situation, consider a case of registering an entry that has been evicted from the sTLB in the fTLB. In that case, the arithmetic processing apparatus registers the evicted entry with the relocation bit validated over the entry having the smallest entry number from among the entries that are registered in the relocation areas of the fTLB and that have the respective valid bit set to OFF. If the valid bit for all of the registered entries is set to ON, then the arithmetic processing apparatus registers the evicted entry over the entry having the smallest entry number from among the entries that have the respective lock bit and the respective used bit set to OFF. Moreover, if all of the registered entries have the respective valid bit set to ON and have either one of the respective lock bit and the respective used bit set to ON, the arithmetic processing apparatus sets the used bit for all entries to OFF and then registers the evicted entry over the entry having the smallest entry number from among the entries that have the respective lock bit and the respective used bit set to OFF.

As a specific example, consider a case of registering an entry 8 that has been evicted from the sTLB in the fTLB. In that case, the arithmetic processing apparatus registers "entry 8, 1, 0, 1, 1" over the area in which the entry 5 was registered as having the smallest entry number from among the entries that are registered in the relocation areas of the fTLB and that have the respective valid bit set to OFF (see (2) in FIG. 7). Subsequently, consider a case of registering an entry 9 that has been evicted from the sTLB in the fTLB. In that case, since all of the registered entries have the respective valid bit set to ON, the arithmetic processing unit registers "entry 9, 1, 0, 1, 1" over the area in which the entry 7 was registered as having the smallest entry number from among the entries that have the respective lock bit and the respective used bit set to OFF (see (3) in FIG. 6).

Subsequently, consider a case of registering an entry 10 that has been evicted from the sTLB in the fTLB. In that case, if all of the entries registered in the relocation registration areas of the fTLB have the respective valid bit set to ON and have either one of the respective lock bit and the respective used bit set to ON, then the arithmetic processing apparatus sets the used bit for all entries registered in the relocation areas to OFF (see (4) in FIG. 7). That is, the arithmetic processing apparatus changes "entry 4, 1, 1, 0, 0"; "entry 8, 1, 0, 1, 1"; "entry 6, 1, 1, 1, 0"; and "entry 9, 1, 0, 1, 1" held by the fTLB to "entry 4, 1, 1, 0, 0"; "entry 8, 1, 0, 0, 1"; "entry 6, 1, 1, 0, 0"; and "entry 9, 1, 0, 0, 1", respectively. Then, the arithmetic processing apparatus registers "entry 10, 1, 0, 1, 1" over the area in which the entry 8 was registered as having the smallest entry number from among the entries that have the respective lock bit and the respective used bit set to OFF (see (5) in FIG. 7).

For each entry subsequently evicted from the sTLB, the arithmetic processing apparatus registers, in an identical manner to (4) in FIG. 7, the evicted entry over that area in the fTLB in which an entry was registered as having the smallest entry number from among the entries in the relocation areas that have the respective lock bit and the respective used bit set to OFF, because each of the entries registered in the relocation areas of the fTLB has the corresponding valid bit set to ON (see (1) to (3) in FIG. 7). Subsequently, when the valid bit for each of the entries registered in the relocation areas becomes ON as well as either one of the lock bit and the used bit for each of the entries registered in the relocation registration areas becomes ON, the arithmetic processing apparatus sets the used bit for all entries registered in the relocation areas to OFF and then registers an evicted entry over the entry having the smallest entry number from among the entries that have the respective lock bit and the respective used bit set to OFF.

In this way, according to the fifth embodiment, the fTLB is divided into direct registration areas used to register entries that have been read directly from the main memory unit and relocation registration areas used to register entries that have been relocated from another TLB. The fTLB includes, for each entry registered therein, a valid bit that indicates whether the corresponding entry is valid; a lock bit that indicates whether the corresponding entry is locked so as to prevent its eviction from a TLB; a used bit that indicates whether the corresponding entry is used; and a relocation bit that indicates whether the corresponding entry has been registered upon being relocated from another TLB. If it is determined that an entry has already been registered in an area of the sTLB as the registration destination for registering an entry read from the main memory unit, then the already-registered entry in the sTLB is evicted therefrom and registered in the fTLB. At that time, the evicted entry is registered with the corresponding relocation bit validated over the entry having the smallest entry number from among the entries that are registered in the relocation areas of the fTLB and that have the respective valid bit set to OFF. If the valid bit for all entries registered in the relocation areas is set to ON, then the evicted entry is registered over the entry having the smallest entry number from among the entries that are registered in the relocation areas and that have the respective lock bit and the respective used bit set to OFF. Moreover, if each of the entries registered in the relocation areas has the corresponding valid bit set to ON and has either one of the corresponding lock bit and the corresponding used bit set to ON, the used bit for all entries in the relocation areas is set to OFF and then the evicted entry is registered over the entry having the smallest entry number from among the entries that are registered in the relocation areas and that have the respective lock bit and the respective used bit set to OFF. Because of that, even when the fTLB, which is used to register an entry evicted from the sTLB, is divided into the direct registration areas and the relocation registration areas, it is possible to register three different types of entries, namely, lock-type entries that cannot be evicted from the fTLB, unlock-type entries that have been registered directly from the main memory unit, and relocation-type entries that have been relocated from the sTLB in the fTLB. That prevents thrashing from occurring and thus enables achieving enhancement in the processing performance.

[f] Sixth Embodiment

In the present embodiment, if the lock bit for all entries registered in an fTLB becomes ON; then, even if an entry is determined to have been already registered in an area of an sTLB as the registration destination for registering an entry read from a main memory unit, evicting the already-registered entry from the sTLB and registering it in the fTLB can be suppressed/prevented. Subsequently, only when the fTLB, which is the relocation destination, is released from the condition that the lock bit for all entries registered therein is set to ON, then the entry that has already been registered in the area of the sTLB as the registration destination can be evicted and registered in the fTLB.

Figure 8:
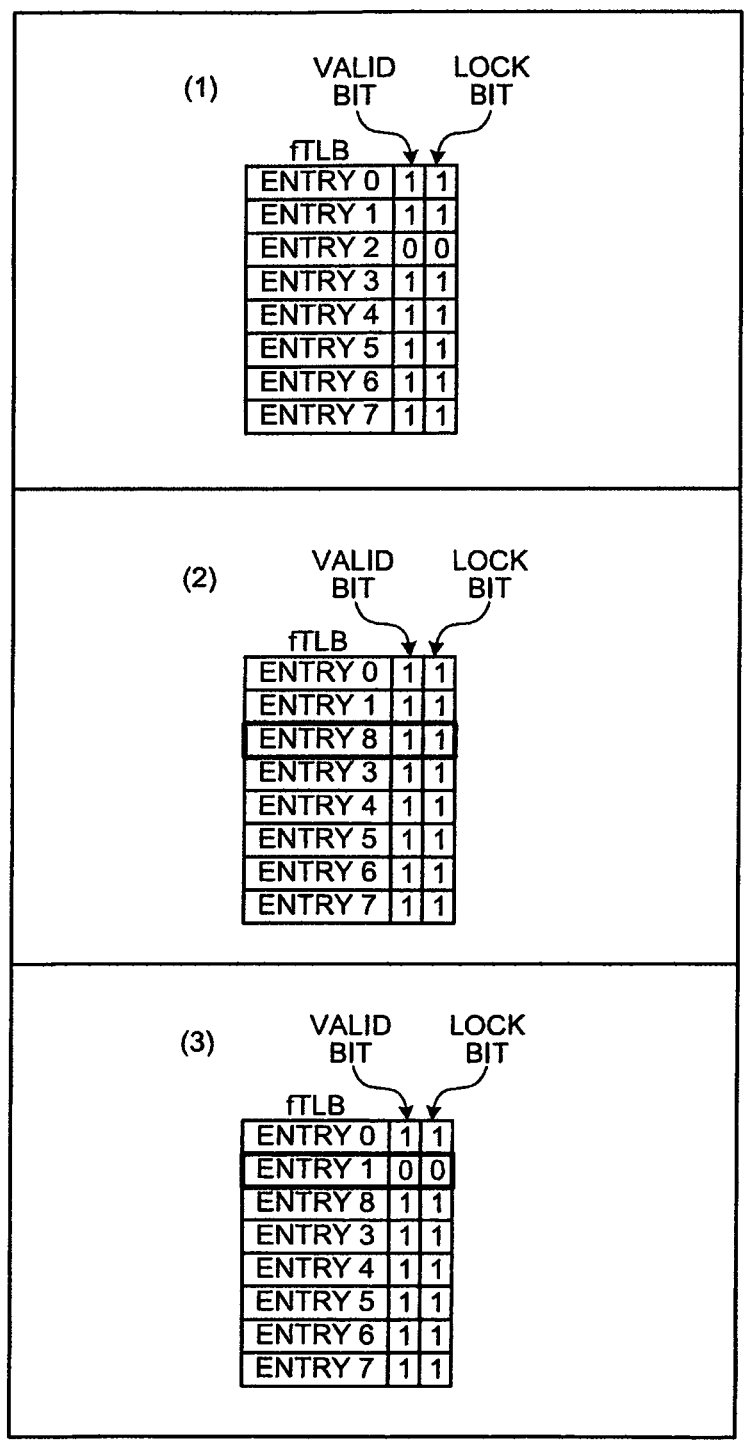
FIG. 8 is a schematic diagram for explaining a sequence of relocation suppression/prevention/resumption with respect to an fTLB having undivided areas in the arithmetic processing apparatus according to a sixth embodiment.
Figure 9:
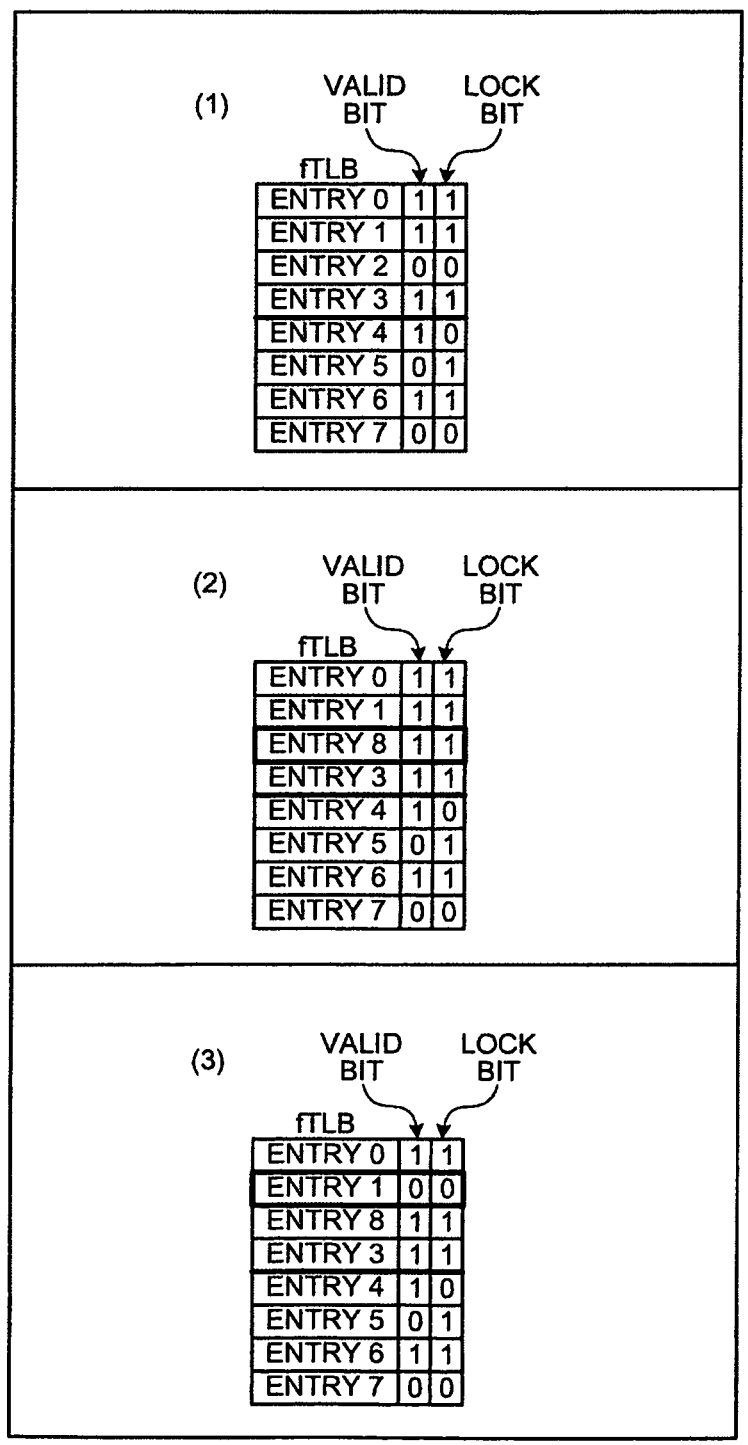
FIG. 9 is a schematic diagram for explaining a sequence of relocation suppression/prevention/resumption with respect to an fTLB having divided areas in the arithmetic processing apparatus according to the sixth embodiment.
Figure 10:
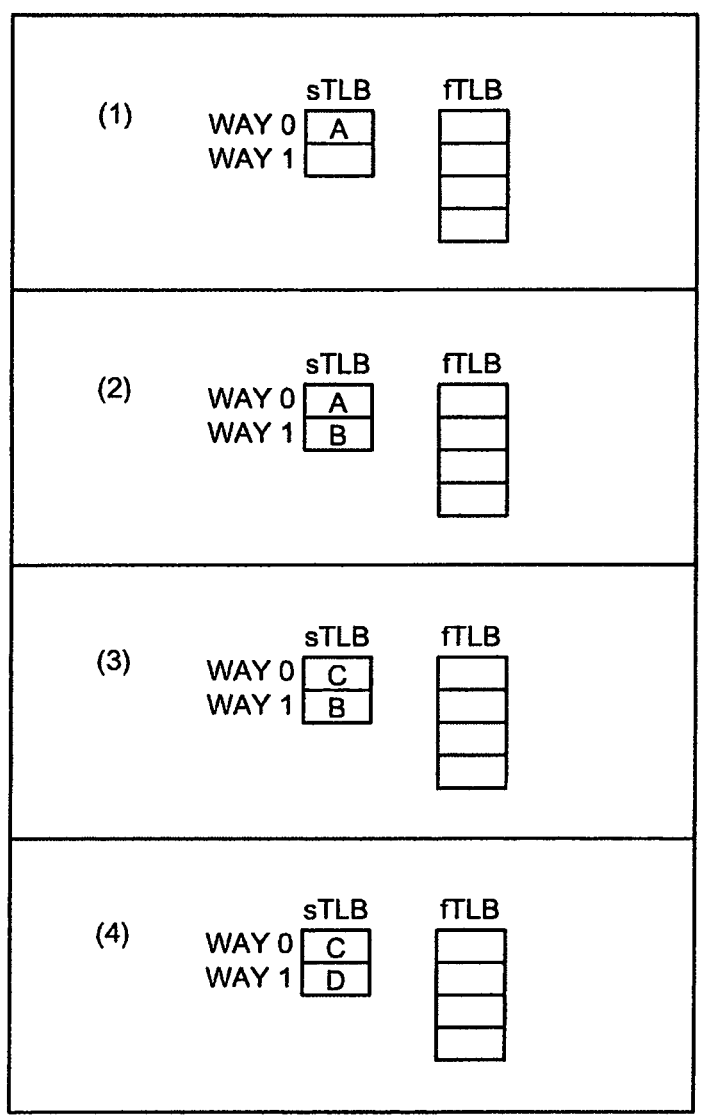
FIG. 10 is a schematic diagram of an information processing apparatus as conventional technology in which a full associative TLB and a 2-way set associative TLB are placed on the same hierarchy.

Thus, in the sixth embodiment, the description is given with reference to FIGS. 8 and 9 for exemplary cases when, if the lock bit for all entries registered in a TLB as the registration destination becomes ON, entry relocation is suppressed/prevented. Subsequently, only when the TLB as the registration destination is released from the condition that the lock bit for all entries registered therein is set to ON, entry relocation is resumed. FIG. 8 is a schematic diagram for explaining a sequence of relocation suppression/prevention/resumption with respect to an fTLB having undivided areas in the arithmetic processing apparatus according to the sixth embodiment. FIG. 9 is a schematic diagram for explaining a sequence of relocation suppression/prevention/resumption with respect to an fTLB having divided areas in the arithmetic processing apparatus according to the sixth embodiment. Meanwhile, regarding each bit illustrated in FIGS. 8 and 9, "1" indicates a valid state and "0" indicates an invalid state.

Firstly, given below is the description with reference to FIG. 8 of a sequence of relocation suppression/prevention/resumption with respect to an fTLB having undivided areas. The fTLB illustrated in FIG. 8 holds in each area an entry having an entry name, a valid bit, and a lock bit in that order. The entries held by the fTLB are: "entry 0, 1, 1"; "entry 1, 1, 1"; "entry 2, 0, 0"; "entry 3, 1, 1"; "entry 4, 1, 1"; "entry 5, 1, 1"; "entry 6, 1, 1"; and "entry 7, 1, 1" (see (1) in FIG. 8).

In that situation, consider a case of registering an entry 8 that has been read from the main memory unit in the fTLB. In that case, the arithmetic processing apparatus registers "entry 8, 1, 1" over the entry 2 having the corresponding valid bit and the corresponding lock bit set to OFF (see (2) in FIG. 8). By registering "entry 8, 1, 1", the lock bit for all of the entries registered in the fTLB becomes ON. That is, the fTLB holds therein "entry 0, 1, 1"; "entry 1, 1, 1"; "entry 8, 1, 1"; "entry 3, 1, 1"; "entry 4, 1, 1"; "entry 5, 1, 1"; "entry 6, 1, 1"; and "entry 7, 1, 1".

Then, the arithmetic processing apparatus switches OFF a write enable signal for the fTLB and suppresses/prevents eviction of an entry that has already been registered in the sTLB and registration of that entry in the fTLB. Subsequently, assuming that the lock bit in "entry 1, 1, 1" is set to "0" and "entry 1, 1, 1" is invalidated to "entry 1, 0, 0" (see (3) in FIG. 8), the arithmetic processing apparatus switches ON the write enable signal for the fTLB and resumes the process of evicting an entry that has already been registered in the sTLB and registering that entry in the fTLB. The subsequent entry relocation processing is identical to that described in the first five embodiments. Hence, that description is not repeated.

Given below is the description with reference to FIG. 9 of a sequence of relocation suppression/prevention/resumption with respect to an fTLB having divided areas. The fTLB illustrated in FIG. 9 holds in each area an entry having an entry name, a valid bit, and a lock bit in that order. The entries held by the fTLB are: "entry 0, 1, 1"; "entry 1, 1, 1"; "entry 2, 0, 0"; "entry 3, 1, 1"; "entry 4, 1, 0"; "entry 5, 0, 1"; "entry 6, 1, 1"; and "entry 7, 0, 0" (see (1) in FIG. 9).

Herein, unlike in the case described with reference to FIG. 8, the four areas corresponding to the entries 0 to 3 are specified as direct registration areas and used to register entries that have been read directly from the main memory unit; while the four areas corresponding to the entries 4 to 7 are specified as relocation registration areas and used to register entries that have been relocated from another TLB.

In that situation, consider a case of registering an entry 8 that has been read from the main memory unit in the fTLB. In that case, the arithmetic processing apparatus registers "entry 8, 1, 1" over the entry 2 having the corresponding valid bit and the corresponding lock bit set to OFF (see (2) in FIG. 9). By registering "entry 8, 1, 1", the lock bit for all entries registered in the direct registration areas of the fTLB becomes ON. That is, in the direct registration areas, the fTLB holds "entry 0, 1, 1"; "entry 1, 1, 1"; "entry 8, 1, 1" and "entry 3, 1, 1".

Then, the arithmetic processing apparatus switches OFF the write enable signal for the fTLB and suppresses/prevents eviction of an entry that has already been registered in the sTLB and registration of that entry in the fTLB. Subsequently, assuming that the lock bit in "entry 1, 1, 1" is set to OFF and "entry 1, 1, 1" is invalidated to "entry 1, 0, 0" (see (3) in FIG. 9), the arithmetic processing apparatus switches ON the write enable signal for the fTLB and resumes the process of evicting an entry that has already been registered in the sTLB and registering that entry in a relocation registration area of the fTLB. The subsequent entry relocation processing is identical to that described in the first five embodiments. Hence, that description is not repeated.

In this way, according to the sixth embodiment, if the lock bit for all entries registered in the fTLB becomes ON; then, even if an entry is determined to have been already registered in the area of the sTLB as the registration destination for registering an entry read from the main memory unit, evicting the already-registered entry from the sTLB and registering it in the fTLB is suppressed/prevented. As a result, a situation in which the entry registration processing is performed with respect to an entry that cannot be registered is prevented from occurring. In addition, the lock-type entries can be protected in a reliable manner.

Moreover, according to the sixth embodiment, only when the fTLB is released from the condition that the lock bit for all entries registered therein is set to ON; the process of evicting an entry that has already been registered in the sTLB as the registration destination for registering an entry read from the main memory unit and registering the evicted entry in the fTLB is resumed. That is, the entry registration processing resumes automatically when the fTLB is released from the condition that the lock bit for all entries registered therein is set to ON. That enables achieving speedy resumption of the entry relocation processing with respect to the fTLB.

Furthermore, according to the sixth embodiment, if the fTLB is released from the condition that the lock bit for all entries registered in the direct registration areas is set to ON; then, even if an entry is determined to have been already registered in the area of the sTLB as the registration destination for registering an entry read from the main memory unit, evicting the already-registered entry from the sTLB and registering it in the relocation registration areas of the fTLB is suppressed/prevented. As a result, even when the fTLB is divided into the direct registration areas and the relocation registration areas, a situation in which the entry registration processing is performed with respect to an entry that cannot be registered is prevented from occurring. In addition, the lock-type entries can be protected in a reliable manner.

Moreover, according to the sixth embodiment, only when the fTLB is released from the condition that the lock bit for all entries registered in the direct registration areas is set to ON; the process of evicting an entry that has already been registered in the sTLB as the registration destination for registering an entry read from the main memory unit and registering the evicted entry in a relocation area of the fTLB is resumed. As a result, even when the fTLB is divided into the direct registration areas and the relocation registration areas; the entry registration processing resumes automatically when the fTLB is released from the condition that the lock bit for all entries registered in the direct registration areas is set to ON. That enables achieving speedy resumption of the entry relocation processing with respect to a TLB.

[g] Seventh Embodiment

Apart from the embodiments described above for the present embodiment, it is also possible to implement various other embodiments. Given below is the description of different embodiments with emphasis on (1) number of ways in an sTLB and (2) system configuration.

(1) Number of Ways in an sTLB

In the first six embodiments, the number of ways in an sTLB is assumed to be two. However, the number of ways is not limited and the abovementioned processing can also be implemented for three ways, five ways, or the like. Moreover, regarding the fTLB, the number of areas is not limited to the number illustrated in drawings.

(2) System Configuration

Of the processes described in the embodiments, all or part of the processes (e.g., outputting an entry including a physical address from a main memory unit) explained as being performed automatically can be performed manually. Moreover, the processing procedures, the control procedures, specific names, various data, and information including parameters described in the embodiments or illustrated in the drawings can be changed as required unless otherwise specified.

Furthermore, The constituent elements of each device illustrated in the drawings are merely conceptual, and need not be physically configured as illustrated. The constituent elements, as a whole or in part, can be separated or integrated either functionally or physically (e.g., integrating the entry registration determining unit and the relocation control unit) based on various types of loads or use conditions.

According to an embodiment of the invention, while registering an entry output from a main memory unit in any one of a plurality of TLBs; it is determined whether an entry has already been registered in an area of a TLB as the registration destination. If it is determined that an entry has already been registered in the area of the TLB as the registration destination, the already-registered entry is evicted and registered in another TLB. That prevents thrashing from occurring and enables achieving enhancement in the processing performance.

Moreover, according to an embodiment of the invention, if it is determined that an entry has already been registered in the area of the TLB as the registration destination; then it is further determined whether an error has occurred in that entry. If an error has occurred, then that entry is discarded without being registered in another TLB. If no error has occurred, then that entry is registered in another TLB. That enables avoiding unnecessary area usage.

Furthermore, according to an embodiment of the invention, if it is determined that an entry has already been registered in the area of the TLB as the registration destination; then the already-registered entry is evicted and an identifier is appended thereto indicating that the entry is not read from the main memory unit but evicted from a TLB before registering it in another TLB. Because of that, it becomes possible to easily determine whether a registered entry has been read from the main memory unit or relocated from another TLB.

Moreover, according to an embodiment of the invention, if same-page entries including an entry that has been evicted from the sTLB are registered in plurality leading to detection of multiple hits; then the evicted entry is removed. As a result, any mismatch attributed to multiple hits can be prevented.

Furthermore, according to an embodiment of the invention, if it is determined that an entry has already been registered in the area of the TLB as the registration destination for registering an entry read from the main memory unit; then the already-registered entry is evicted and registered with the relocation bit validated over an entry having the smallest entry number from among entries that are already registered in the other TLB and that have the respective valid bit set to OFF. If the valid bit for all of the registered entries is set to ON, then the evicted entry is registered with the relocation bit validated over an entry having the smallest entry number from among the entries that have the respective lock bit and the respective used bit set to OFF. Moreover, if all of the registered entries have the respective valid bit set to ON and have either one of the respective lock bit and the respective used bit set to ON, then the used bit for all entries is set to OFF and then the evicted entry is registered with the relocation bit validated over an entry having the smallest entry number from among the entries that have the respective lock bit and the respective used bit set to OFF. Because of that, even when three different types of entries, namely, lock-type entries that cannot be evicted from a TLB, unlock-type entries that have been registered directly from the main memory unit, and relocation-type entries that have been output from a TLB are present, it is possible to prevent thrashing from occurring and thus enhance the processing performance.

Moreover, according to an embodiment of the invention, if the lock bit for all entries registered in the other TLB becomes ON; then, even if an entry is determined to have been already registered in the area of the TLB as the registration destination for registering an entry read from the main memory unit, evicting that already-registered entry and registering it in the other TLB is suppressed/prevented. As a result, a situation in which the entry registration processing is performed with respect to an entry that cannot be registered is prevented from occurring. In addition, the lock-type entries can be protected in a reliable manner.

Furthermore, according to an embodiment of the invention, only when the other TLB is released from the condition that the lock bit for all entries registered therein is set to ON; the process of evicting the entry that has already been registered in the area of the TLB as the registration destination for registering an entry read from the main memory unit and registering the evicted entry in the other TLB is resumed. That is, the entry registration processing resumes automatically when the other TLB is released from the condition that the lock bit for all entries registered therein is set to ON. That enables achieving speedy resumption of the entry relocation processing with respect to a TLB.

Moreover, according to an embodiment of the invention, if it is determined that an entry has already been registered in the area of the TLB as the registration destination for registering an entry read from the main memory unit; then the already-registered entry is evicted and registered in the other TLB. At that time, the evicted entry is registered over an entry having the smallest entry number from among entries that are registered in the relocation areas of the other TLB and that have the respective valid bit set to OFF. If the valid bit for all entries registered in the relocation areas is set to ON, then the evicted entry is registered over an entry having the smallest entry number from among the entries that are registered in the relocation areas and that have the respective lock bit and the respective used bit set to OFF. Moreover, if each of the entries registered in the relocation areas has the corresponding valid bit set to ON and has either one of the corresponding lock bit and the corresponding used bit set to ON, the used bit for all entries in the relocation areas is set to OFF and then the evicted entry is registered over an entry having the smallest entry number from among the entries that are registered in the relocation areas and that have the respective lock bit and the respective used bit set to OFF. Because of that, even when the other TLB is divided into the direct registration areas and the relocation registration areas, it is possible to register three different types of entries, namely, lock-type entries that cannot be evicted from a TLB, unlock-type entries that have been registered directly from the main memory unit, and relocation-type entries that have been relocated from another TLB. That prevents thrashing from occurring and thus enables achieving enhancement in the processing performance.

Furthermore, according to an embodiment of the invention, if the lock bit for all entries registered in the relocation registration areas of the other TLB becomes ON; then, even if an entry is determined to have been already registered in the area of the TLB as the registration destination for registering an entry read from the main memory unit; evicting the already-registered entry and registering it in the relocation areas of the other TLB is suppressed/prevented. As a result, even when the other TLB is divided into the direct registration areas and the relocation registration areas, a situation in which the entry registration processing is performed with respect to an entry that cannot be registered is prevented from occurring. In addition, the lock-type entries can be protected in a reliable manner.

Moreover, according to an embodiment of the invention, when the other TLB is released from the condition that the lock bit for all entries registered in the direct registration areas is set to ON; the process of evicting the entry that has already been registered in the area of the TLB as the registration destination for registering an entry read from the main memory unit and registering the evicted entry in a relocation area of the other TLB is resumed. As a result, even when the other TLB is divided into the direct registration areas and the relocation registration areas; the entry registration processing resumes automatically when the other TLB is released from the condition that the lock bit for all entries registered in the direct registration areas is set to ON. That enables achieving speedy resumption of the entry relocation processing with respect to a TLB.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A processor connected to a main memory unit, the processor comprising:
    a plurality of translation lookaside buffers (TLBs) holding as entries a portion of a conversion table for conversion between virtual addresses and physical addresses that has been stored in a main memory unit, a TLB of the plurality of TLBs including, for each of the entries registered therein, a valid bit that indicates whether a corresponding entry is valid and a relocation bit that indicates that the corresponding entry is not directly output from the main memory unit but is output from another TLB of the plurality of TLBs;
    a determining unit that determines whether an entry output from the main memory unit has already been registered in an entry of a registering destination of a TLB of the plurality of TLBs; and
    a control unit that evicts the entry that has already been registered and registers the evicted entry in another TLB of the plurality of TLBs, the evicted entry being registered, with a corresponding relocation bit validated, in an entry having a smallest entry number from among entries that are already registered in the another TLB and that have a respective valid bit set to indicate the corresponding entry is invalid when the determining unit determines that an entry has already been registered in the registering destination of the TLB.

2. The processor according to claim 1, wherein, when the determining unit determines that an entry has already been registered in the registering destination of the TLB, the control unit evicts the entry that has already been registered; determines whether the evicted entry has a parity check error; and, in case of the parity check error, discards the evicted entry without registering in another TLB and, in case of no error, registers the evicted entry in another TLB.

3. The processor according to claim 1 further comprising an entry removing unit that, when an entry is, by the control unit, evicted from the TLB and registered in the another TLB where a same-page entry is registered and includes, in a page of the same-page entry the entry, resulting in detection of a multiple hit, removes the evicted entry.

4. The processor according to claim 1, wherein
    the plurality of TLBs also include, for each of the entries registered therein, a lock bit that indicates whether the corresponding entry is locked so as to prevent eviction from a TLB of the plurality of TLBs, and a used bit that indicates whether the corresponding entry is used, and
    when the determining unit determines that an entry has already been registered in an area of a TLB of the plurality of TLBs, the area being a registering destination for an entry output from the main memory unit, the control unit evicts the entry that has already been registered and,
    if the valid bit for all entries that are already registered indicating valid, registers in another TLB the evicted entry with the corresponding relocation bit validated in an entry having a smallest entry number from among entries that are already registered in the another TLB and that have their respective lock bit and respective used bit set to indicate the entries are not locked and not used, respectively; and,
    if all entries that are already registered have their respective valid bit indicating valid and have either one of their respective lock bit and respective used bit indicating locked or used, sets the used bit for the all entries to indicate the all entries are not used and registers the evicted entry with the corresponding relocation bit validated in an entry having a smallest entry number from among entries that have their respective lock bit and respective used bit set to indicate the entries are not locked and not used, respectively.

5. The processor according to claim 4, wherein, when the lock bit for all entries registered in the another TLB becomes indicating locked and the determining unit determines that an entry has already been registered in an area of a TLB, the area being a registering destination for an entry output from the main memory unit, the control unit does not execute eviction of the entry that has already been registered and registering of evicted entry in the another TLB.

6. The processor according to claim 5, wherein, when the lock bit for any one of entries registered in the another TLB is released from a locked state, the control unit resumes evicting the entry that has already been registered in an area of a TLB, the area being a registering destination for an entry output from the main memory unit and registering the evicted entry in the another TLB.

7. The processor according to claim 1, wherein
    each of the plurality of TLBs is divided into a direct registration area used to register an entry that is output directly from the main memory unit and a relocation registration area used to register an entry that has been subjected to relocation control from another TLB, and includes, for each of entries registered therein, a lock bit that indicates whether a corresponding entry is locked so as to prevent eviction from a TLB of the plurality of TLBs, and a used bit that indicates whether the corresponding entry is used, and
    when the determining unit determines that an entry has already been registered in an area of a TLB of the plurality of TLBs, the area being a registering destination for an entry output from the main memory unit, the control unit evicts the entry that has already been registered and registers in another TLB the evicted entry in an entry having a smallest entry number from among entries that have been registered in the relocation registration area of the another TLB and that have a respective valid bit set to indicate the entries are invalid;
    if the valid bit indicates valid for all entries that have been registered in the relocation registration area, registers the evicted entry in an entry having a smallest entry number from among entries that have been registered in the relocation registration area and that have a respective lock bit and a respective used bit set to indicate the entries are not locked and not used, respectively; and if all entries that have been registered in the relocation registration area have the respective valid bit indicating valid and have either one of the respective lock bit and the respective used bit indicating locked or used, sets the used bit for the all entries to indicate the all entries are not used and registers the evicted entry in an entry having a smallest entry number from among entries that have been registered in the relocation registration area and that have the respective lock bit and the respective used bit set to indicate the entries are not locked and not used, respectively.

8. The processor according to claim 7, wherein, when the lock bit for all entries registered in the direct registration area of the another TLB becomes indicating locked and the determining unit determines that an entry has already been registered in an area of the direct registration area of the another TLB, the area being a registering destination for an entry output from the main memory unit, the control unit does not execute eviction of the entry that has already been registered and registering of evicted entry in the relocation registration area of another TLB; and an entry to be directly registered from the main memory unit is registered in the relocation registration area of another TLB.

9. The processor according to claim 8, wherein, when the lock bit for any one of the all entries registered in the direct registration area of the another TLB is released from a locked state, the control unit resumes evicting of an entry that has already been registered in an area of the direct registration area of the another TLB, the area being a registering destination for an entry output from the main memory unit and registering of the evicted entry in the relocation registration area of another TLB.

10. An entry control method for an information processing apparatus including a plurality of translation lookaside buffers (TLBs) holding as entries a portion of a conversion table for conversion between virtual addresses and physical addresses that has been stored in a main memory unit, a TLB of the plurality of TLBs including, for each of the entries registered therein, a valid bit that indicates whether a corresponding entry is valid and a relocation bit that indicates that the corresponding entry is not directly output from the main memory unit but is output from another TLB of the plurality of TLBs, the entry control method comprising:

determining whether an entry output from the main memory unit has already been registered in an entry of a registering destination of a TLB of the plurality of TLBs; and evicting the entry that has already been registered and registering the evicted entry in another TLB of the plurality of TLBs, the evicted entry being registered, with a corresponding relocation bit validated, in an entry having a smallest entry number from among entries that are already registered in the another TLB and that have a respective valid bit set to indicate the corresponding entry is invalid when it is determined in the determining that an entry has already been registered in the registering destination of the TLB.

\* \* \* \* \*